United States Patent [19]

Barr

[11] Patent Number: 5,894,303
[45] Date of Patent: Apr. 13, 1999

[54] COMPUTER MOUSE AND SHELL THEREFORE

[76] Inventor: Ann E. Barr, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/846,502

[22] Filed: Apr. 28, 1997

Related U.S. Application Data

[63] Continuation of application No. 08/403,655, Mar. 14, 1995, abandoned.

[51] Int. Cl.[6] ........................................................ G09G 5/08
[52] U.S. Cl. ........................................ 345/163; D14/114
[58] Field of Search ............................................ 345/156, 157, 345/163, 164, 165, 166; D14/100, 107, 114; 273/148 B; 74/471 XY; 200/5 R, 5 A, 6 R, 6 A

[56] References Cited

U.S. PATENT DOCUMENTS

| | | |
|---|---|---|
| D. 281,164 | 10/1985 | Kim. |
| D. 283,818 | 5/1986 | Skaggs. |
| D. 288,569 | 3/1987 | Ida. |
| D. 288,930 | 3/1987 | Barbera et al.. |
| D. 301,142 | 5/1989 | Chu. |
| D. 302,426 | 7/1989 | Bradley et al.. |
| D. 305,331 | 1/1990 | Esslinger. |
| D. 305,649 | 1/1990 | Lin. |
| D. 306,017 | 2/1990 | Shulman et al.. |
| D. 307,137 | 4/1990 | Alfonso. |
| D. 313,981 | 1/1991 | Yang. |
| D. 328,596 | 8/1992 | Manabe. |
| D. 328,597 | 8/1992 | Clouss. |
| D. 330,706 | 11/1992 | San-Yih. |
| D. 331,043 | 11/1992 | Yang. |
| D. 331,231 | 11/1992 | Yang. |
| D. 337,321 | 7/1993 | Koh et al.. |
| D. 340,926 | 11/1993 | Lin. |
| D. 343,392 | 1/1994 | Harden et al.. |
| D. 347,833 | 6/1994 | Bisenius et al. ............... D14/114 |
| 4,464,652 | 8/1984 | Lapson et al.. |
| 4,514,726 | 4/1985 | Whetstone et al.. |
| 4,754,268 | 6/1988 | Mori. |
| 4,787,051 | 11/1988 | Olson. |
| 4,806,917 | 2/1989 | Hosogoe. |
| 4,862,165 | 8/1989 | Gart. |
| 4,917,516 | 4/1990 | Retter. |
| 4,961,138 | 10/1990 | Gorniak. |
| 4,963,858 | 10/1990 | Chien. |
| 4,994,795 | 2/1991 | MacKenzie. |
| 5,038,144 | 8/1991 | Kaye. |
| 5,095,302 | 3/1992 | McLean et al.. |
| 5,115,227 | 5/1992 | Keiji. |
| 5,157,381 | 10/1992 | Cheng. |
| 5,161,760 | 11/1992 | Terbrack. |
| 5,175,534 | 12/1992 | Thatcher. |
| 5,223,709 | 6/1993 | Pettypiece, Jr.. |
| 5,230,623 | 7/1993 | Guthrie et al.. |
| 5,252,970 | 10/1993 | Baronowsky. |
| 5,260,696 | 11/1993 | Maynard, Jr.. |
| 5,291,213 | 3/1994 | Krauss. |
| 5,296,871 | 3/1994 | Paley. |
| 5,298,919 | 3/1994 | Chang. |
| 5,355,147 | 10/1994 | Lear ............................ 345/163 |
| 5,576,733 | 11/1996 | Lo ............................... 345/163 |

*Primary Examiner*—Regina Liang
*Attorney, Agent, or Firm*—Stephen E. Feldman

[57] ABSTRACT

A hand holdable computer mouse has a base, a top and a body. The base rests on a work surface and the body is vertically disposed above the base. The body has an external contour which substantially conforms to the mean of the contour of the palm side of the hand when the hand is in a relaxed, neutral condition, with the palm surface of the hand vertically oriented. The mouse is operated with the hand in a cupped, vertically oriented condition, with the wrist in a neutral condition with respect to radial and ulnar deviation, and with the forearm in a neutral condition.

5 Claims, 2 Drawing Sheets

COMPUTER MOUSE AND SHELL THEREFORE

This application is a continuation of application Ser. No. 08/403,655, filed Mar. 14, 1995, now abandoned.

BACKGROUND OF THE INVENTION

1. Field of the Invention

The present invention relates to manually controlled devices for generating multi-dimensional data for input to a microprocessor or computer. In particular, the present invention relates to a computer mouse and/or shell therefore which is normally operated with the upper extremity of the person operating the computer or microprocessor to which the device is connected, by holding and controlling the device while maintaining the upper extremity in a neutral attitude, without pronation-supination of the forearm or radial-ulnar deviation of the wrist or hand.

2. Prior Art

A computer mouse is a common device used in conjunction with a computer, for example, for multi-dimensional control of cursor movement on the screen or CRT of a monitor of a computer. A computer mouse usually includes a captured ball or sphere, a portion of which extends from the interior of the mouse. The mouse is moved over a surface, with the ball in contact with the surface so that the ball rolls over the surface defining the direction of movement of the mouse across the surface. The movement of the ball generates a two-dimensional data input for computer cursor control, which is visible on the screen or monitor of the computer. Two coordinate wheels are supported internally in the mouse which are driven by the ball as the ball rolls across the surface of a pad, for example, in accordance with the vector movement of the mouse.

A computer mouse also carries one or more buttons or switches which are operated by the person operating the mouse, for providing signals to the computer to perform one or another function, often related with the location or position of the cursor on the screen. Most computer mice currently carry one button or switch which provides a signal to the computer which is coordinated with the location of the cursor on the screen and a second button or switch which provides a signal to the computer which is independent of the cursor.

A conventional computer mouse is horizontally oriented and normally controlled by the hand and arm of an individual working on or with the computer to which the mouse is connected.

An alternative to a computer mouse is a device called a trackball. The trackball serves the same function as a mouse, relative to the computer. The trackball is essentially a stationary device with a ball mounted for full rotational movement within the mounting base. A portion of the ball is exposed so that the ball may be rotated, as desired, within its mounting, by the thumb, fingers or part of the palm of the hand, for example.

Where the mouse device is moved across a surface, for rolling the ball mounted in the mouse, across such surface, the trackball device is maintained stationary while the ball mounted in the trackball is rolled within its mounting by the thumb or fingers, for example, driving the ball. In some computer environments the devices are competitive, in other computer environments the devices are noncompetitive.

Of the two devices, the computer mouse has been designed into the "Dove Bar" mouse design, a design that is particularly suited for hand operation across the surface of a plane. The Dove Bar computer mouse is horizontally oriented and is operated normally with the hand, with the palm of the hand facing downward, over the top of the Dove Bar mouse, grasping the mouse and moving the Dove Bar mouse across the surface of a desk, for example. The Dove Bar mouse is moved by using the arm and shoulder muscles. However, when one uses the Dove Bar mouse, the forearm of the person operating the mouse is twisted into a nonneutral position, the palm or flat of the hand rotated for covering and holding the horizontally disposed Dove Bar mouse. The article "MICE VS. TRACKBALLS" by Lorraine Rice, published in PC Magazine, August 1990 edition, at pages 216–217 points out some differences between the Dove Bar design mouse and the Trackball used in conjunction with computers. The article discusses each device and describes how each is held and operated but fails to consider that, in the case of the mouse, the extremity of the person holding and/or operating the mouse is twisted into a nonneutral position, i.e., the open hand is rotated, approximating a substantially horizontal plane, with the palm of the hand facing downward. When operating the trackball, the ball of the trackball is rotated directly by finger and/or thumb manipulation. Operation of both these devices is accomplished in strained and nonneutral positions of the extremity and are overly taxing and tiresome. The present invention, an ergonomic computer mouse, overcomes this problem.

SUMMARY OF THE INVENTION

The present invention provides a novel ergonomic computer mouse having an external contour or shape that conforms to the smoothed-out mean of the contour of the palm or inside surface of the hand when the hand is in a neutral state. The mass of the ergonomic computer mouse is vertically oriented so that the hand, wrist and forearm of the person holding and operating the mouse are maintained in a neutral disposition, without radial deviation nor ulnar deviation, with the palm of the hand vertically disposed and the hand essentially resting on the ulnar portion thereof. Excursions of the novel mouse across the work surface are effected by wrist flexion and extension without radial deviation nor ulnar deviation and without forearm pronation nor supination but with neutrally oriented forearm and shoulder muscles.

The vertically oriented novel mouse rests in a base which is essentially flat. The novel mouse includes a captive ball, mounted for rotational movement within its mounting. The ball is bias mounted and extends from the base and makes rolling contact with the surface over which the mouse is moved or driven. Rotation of the ball in its mounting drives two coordinate wheels which are suspended internally within the mouse and mechanically coupled to the ball. The two coordinate wheels are electrically coupled to the computer interface. The internal structure of the mouse may be that which is well known in the art, an example of which is taught and shown in the U.S. Pat. No. 5,298,919, issued Mar. 29, 1994 to Mingtal Chang.

The present novel computer mouse includes buttons or switches, at least two, which are located on or in the external surface of the mouse and positioned in an upper portion of an end of the mouse so that each switch is available for independent actuation by a respective finger of the hand. The novel computer mouse has an essentially flat top and an essentially flat bottom. The mouse is vertically oriented, standing upright on its base, when in working orientation, with the captive ball making contact with the surface on which the mouse is positioned. This position orients the mass of the novel computer mouse in vertical orientation. When viewed from the front of the mouse or from the back of the mouse, the external contour of the mass is symmetrical, defining the smoothed-out mean or average of the contour of the inside (palm side) surface of the right hand and left hand, respectively, when the hand is in a relaxed, neutral state.

The vertically oriented ergonomic computer mouse rests on its base on a surface, such as a desk surface, for example, when in use. The vertically disposed orientation of the mass of the mouse provides that the hand of an operator also be vertically disposed in order to grasp and secure and work the mouse and that the vertical orientation of the hand be maintained during operation of the mouse. The external contour of the right and left sides of the mouse being a smoothed-out mean of the contour of the inside surface of the right and left hand respectively, and when the hand is in a relaxed, neutral, such as a cupped, condition, provides an ergonomic mouse which may be held and operated while maintaining the operating hand, and wrist, in the radial-ulnar deviation plane, and forearm in a neutral state, reducing substantially the operating effort of the operator of the mouse.

The novel ergonomic computer mouse includes buttons or switches, such as actuatable contacts, which are located on the forward end portion of the mouse, spaced progressively from the top of the mouse. The buttons are spaced so that each button will lie under the neutrally positioned index finger and middle finger, respectively, when the mouse is grasp by a hand, for independent actuation by tactile pressure on the respective button by the index finger and the middle finger respectively, as desired.

The orientation and external surface contour of the ergonomic mouse provides for grasping the mouse by the hand of a person-operator while the hand and wrist, in the radial-ulnar deviation plane, and forearm of the person are maintained in a completely neutral, natural state. The external surface contour of the novel computer mouse is appropriate for either right hand or left hand use.

OBJECTS OF THE INVENTION

It is an object of the invention to provide a computer mouse which has an external contour which substantially conforms to the mean of the contour of the palm side surface of the hand, when the hand is in a relaxed, neutral condition, with the palm surface vertically disposed.

Another object is to provide a computer mouse which is of a size and has an external contour so that the mouse will nest substantially in a hand of the user, with the palm surface of the hand disposed vertically while the wrist is maintained in a position of neutral radial-ulnar deviation and the forearm is maintained in a position of neutral pronation-supination.

These and other objects will become apparent when reading the following description with reference to the drawings.

DETAILED DESCRIPTION OF THE INVENTION

Throughout the detailed description of the invention, referenced to the drawings, common parts or areas of the invention are identified by identical call-out numbers. Referring to the FIGS. 1–5, in general, the invention is an ergonomic computer mouse which is vertically oriented and an external contour defined by symmetry between the right hand and left hand sides. Each side of the ergonomic computer mouse, from front to back, is substantially a smoothed-out mean of the contour of the inside surface of the hand, when the hand is in a relaxed, neutral condition, with the palm of the hand vertically disposed. The vertically oriented mouse sits on a base 10. The base or rim thereof is essentially in the same plane. A ball 11, is mounted in the interior of the mouse so that the ball protrudes somewhat from the surface of the base, breaking the plane of the base and makes contact with the surface on which the mouse rests, such as a desk, for example. It is not necessary that the full surface of the base of the mouse be flat, or on the same plane. However, and alternatively, the perimeter of the base should be on the same plane, while the surface inside the perimeter may have some concave characteristics, however, preferably, the ball 11, captured by the mouse, is biased so that the ball extends from the base of the mouse and passes through the plane defined by the perimeter of the base.

Figure 1:
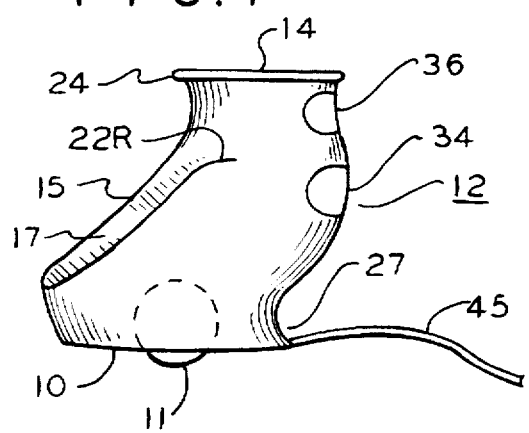
FIG. 1 is a representation of the right hand side of the invention, in side elevation view.
Figure 1A:
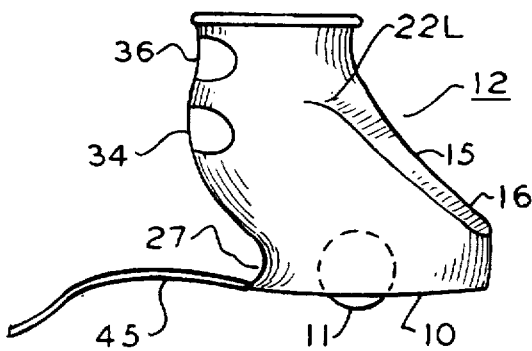
FIG. 1a is a representation of the left hand side of the invention, in side elevation view.
Figure 3:
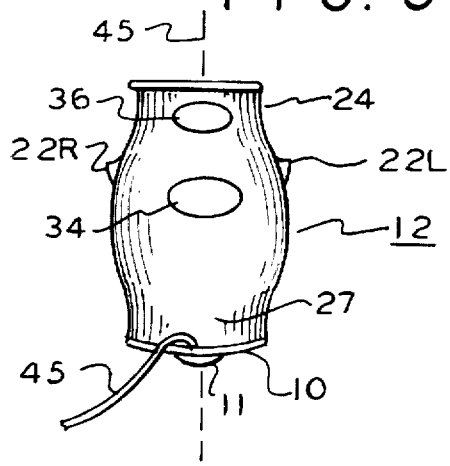
FIG. 3 is a representation of the invention, in front end view.
Figure 4:
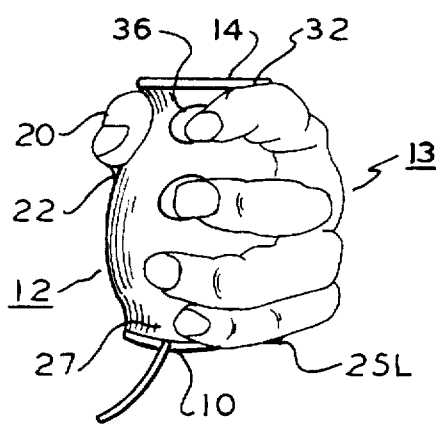
FIG. 4 is a representation of the invention as shown in FIG. 3, grasped in the left hand.

As shown in FIGS. 1–5, the body 12 of the mouse is vertically disposed on its base 10 when operated. FIGS. 1, 1a and 3 show the symmetry of the external contour of the mouse. FIGS. 1 and 1a, show that the back end of the mouse extends rearwardly from the base 10 and drops in a shallow slope from the top 14, with a central portion of the back end defining a vaulted surface which falls off to the left 16 and to the right 17 thereof forming a vaulted or pitched seat for the hand. The center of the vaulted surface follows the natural crease in the inner surface of the cupped hand 13, formed by the base of the thumb and the flat of the palm of the hand, when the hand is in a relaxed state. The thumb 20 of the hand 13 rests on an upper outer extension 22 of the vaulted surface. The junction of the thumb and index finger nests on the neck 24 of the mouse.

Figure 5:
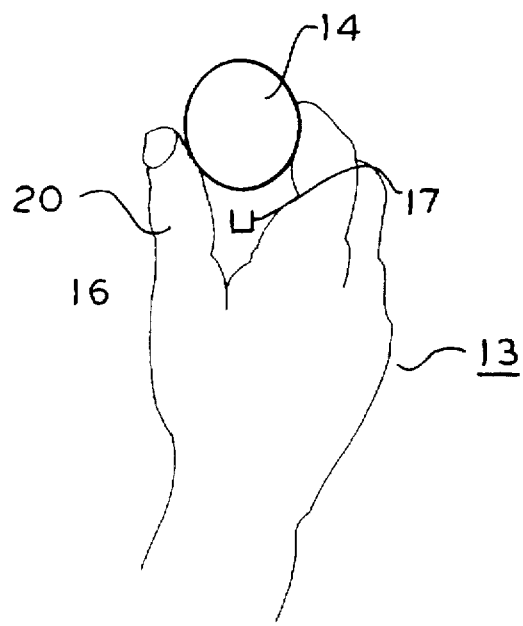
FIG. 5 is a perspective view of the invention, from the top thereof, showing the invention nested in the right hand; and, FIG. 6 is a block diagram of the electro-mechanical features of the invention.

In FIG. 5, the hand 13 is represented dropped back, for convenience, so that the surfaces 16 and 17 of the vaulted back surface may be represented, relative to how the concave surface of the hand fits on the vaulted surface of the mouse.

Figure 2:
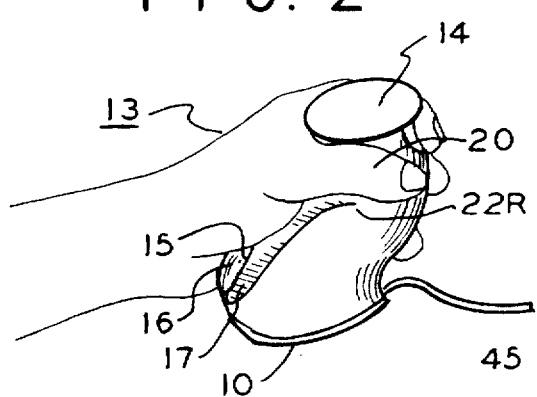
FIG. 2 is a perspective view of the right hand side of the invention, showing the invention grasped by the left hand.
Figure 2A:
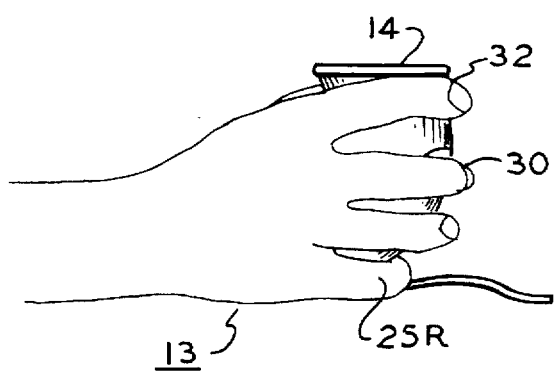
FIG. 2a is a perspective view of the right hand side thereof, showing the invention grasped by the right hand.

The front surface of the mouse essentially follows the smoothed-out mean of the inside of the curled fingers of the cupped hand. The small finger or pinky 25R, FIG. 2a, and 25L, FIG. 4, conveniently fits adjacent the base, circling around the recessed front bottom 27 while the forward extending contour of the front end forms a seat for the longer fingers of the hand. The middle finger 30 and the index finger 32 extend around the upper front end of the body of the mouse and each finger makes contact with one button, respectively, of two spaced buttons 34 and 36, which are preferably flush mounted, pressure sensitive buttons or switches, although other switches may be used, if desired.

Figure 6:
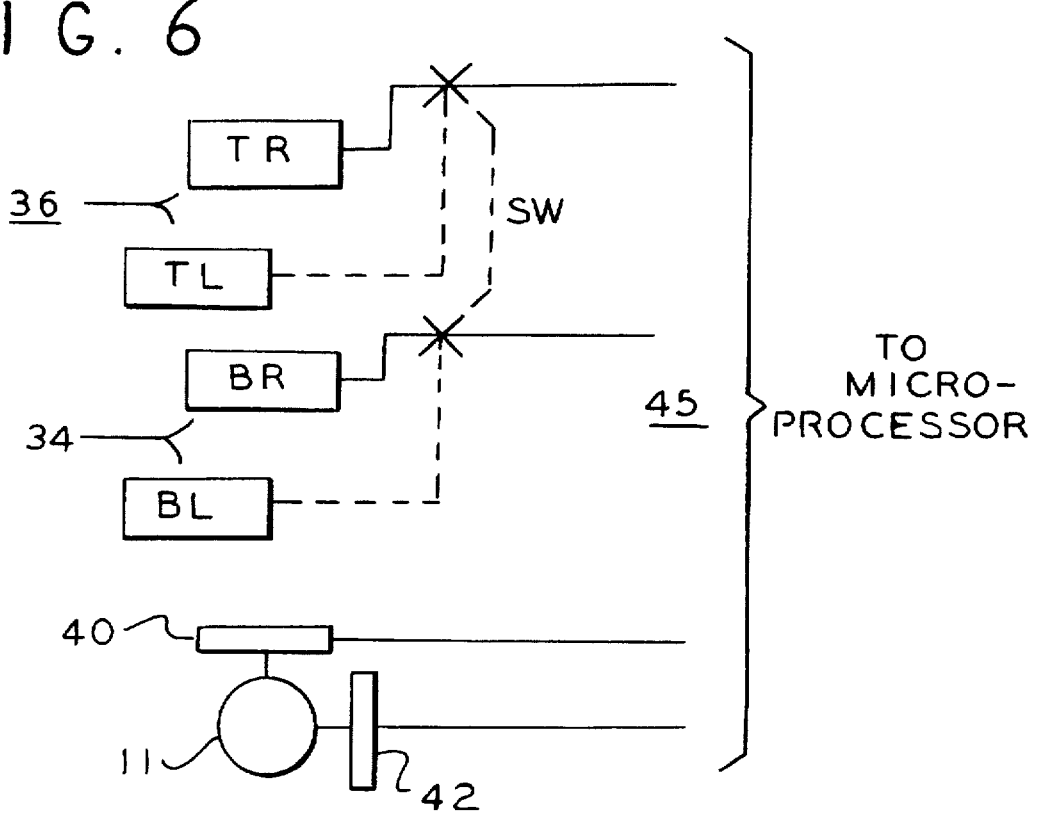

In FIG. 6, the block diagram of the electro-mechanical features of the invention, each of the buttons 36 and 34 are represented as two buttons TR (top right) and TL (top left) (36) and BR bottom right) and BL (bottom left) (34), each button slightly offset from the dead center of the front end of the mouse. The pairs of buttons are coupled into the output circuit selectively, by a switch SW. The switch SW may be located in the top 14 of the mouse, if desired.

The ball 11 and the cooperative drive wheels 40 and 42 are represented in FIG. 6. The ball 11 drives the wheels as the ball rolls across the surface traversed by the mouse. The wheels effectively define the vector course of the mouse. The wheels 40 and 42 are electrically connected to interface with a microprocessor or computer, in a manner which is well known in the art. The buttons 34 and 36 are also electrically interfaced into the microprocessor or computer, as is well known in the art. A cable 45, the electrical connection to the interface, is represented extending from the base of the mouse.

Thus, a preferred embodiment of an ergonomic computer mouse has been shown and described, along with an alternate arrangement of buttons. Other changes and modifications may be made that may be made apparent to those skilled in the art, without departing from the invention.

What is claimed is:

1. A manually operable mouse for enabling an operator to provide multi-dimensional data to a computer, comprising:

a substantially flat, planar base;

a rotatable ball vertically displaceably mounted within said substantially planar base for rotatably contacting a supporting surface for said mouse;

a top surface; and, a generally deformed, substantially cylindrical, substantially continuous side wall joining said top to said base, having a mean longitudinal axis inclined relative to said supporting surface at an angle substantially greater than 0°, but substantially less than 90°, when in use by said operator; said side wall comprising a left vaulted surface and a right vaulted surface which are vertically symmetrical sufficient for supporting the base of the thumb or the palm of the hand of said operator;

wherein, said generally deformed, substantially cylindrical, substantially continuous side wall is designed, dimensioned, and contoured to enable the palm of said operator to be disposed substantially vertical to said supporting surface; and, to enable the hand, wrist and forearm of said operator to be maintained in a neutral position that substantially precludes; radial or ulnar deviation of the wrist; and, pronation or supination of the forearm; of said operator, while operating said mouse.

2. The manually operable mouse of claim 1, wherein said generally deformed, substantially cylindrical, substantially continuous side wall further comprises:

a first depressable button switch mounted therein, including a switch activation surface, sized, shaped, dimension and spaced thereon, for enabling engagement thereof, by the forefinger of said operator; and, a second depressable button switch mounted therein, including a switch activation surface, sized, shaped, dimension and spaced thereon, for enabling engagement thereof, by the middle finger of said operator.

3. In a manually operable mouse for enabling an operator to provide multi-dimensional data to a computer; a substantially flat, planar base; a rotatable ball vertically displaceably mounted within said substantially planar base for rotatably contacting a supporting surface for said mouse; the improvement comprising:

a top surface; and, a generally deformed, substantially cylindrical, substantially continuous side wall joining said top to said base, having a mean longitudinal axis inclined relative to said supporting surface at an angle substantially greater than 0°, but substantially less than 90°, when in use by said operator; said side wall comprising a left vaulted surface and a right vaulted surface which are vertically symmetrical sufficient for supporting the base of the thumb or the palm of the hand of said operator;

wherein, said generally deformed, substantially cylindrical, substantially continuous side wall is designed, dimensioned, and contoured to enable the palm of said operator to be disposed substantially vertical to said supporting surface; and, to enable the hand, wrist and forearm of said operator to be maintained in a neutral position that substantially precludes; radial or ulnar deviation of the wrist; and, pronation or supination of the forearm; of said operator, while operating said mouse.

4. The manually operable mouse of claim 3, wherein said generally deformed, substantially cylindrical, substantially continuous side wall further comprises:

a first depressable button switch mounted therein, including a switch activation surface, sized, shaped, dimension and spaced thereon, for enabling engagement thereof, by the forefinger of said operator; and, a second depressable button switch mounted therein, including a switch activation surface, sized, shaped, dimension and spaced thereon, for enabling engagement thereof, by the middle finger of said operator.

5. A manually operable mouse for enabling an operator to provide multi-dimensional data to a computer, comprising:

a substantially flat, planar base;

a rotatable ball vertically displaceably mounted within said substantially planar base for rotatably contacting a supporting surface for said mouse;

a top surface; and, a generally deformed, substantially cylindrical, substantially continuous side wall joining said top to said base, having a mean longitudinal axis inclined relative to said supporting surface at an angle substantially greater than 0°, but substantially less than 90°, when in use by said operator;

wherein, said generally deformed, substantially cylindrical, substantially continuous side wall is designed, dimensioned, and contoured to enable the palm of said operator to be disposed substantially vertical to said supporting surface; and, to enable the hand, wrist and forearm of said operator to be maintained in a neutral position that substantially precludes; radial or ulnar deviation of the wrist; and, pronation or supination of the forearm; of said operator, while operating said mouse; said side wall comprising a left vaulted surface and a right vaulted surface which are vertically symmetrical sufficient for supporting the base of the thumb or the palm of the hand of said operator;

a first depressable button switch mounted within said side wall, including a switch activation surface, sized, shaped, dimension and spaced thereon, for enabling engagement thereof, by the forefinger of said operator; and, a second depressable button switch mounted within said side wall, including a switch activation surface, sized, shaped, dimension and spaced thereon, for enabling engagement thereof, by the middle finger of said operator.

* * * * *